(12) United States Patent
Suzuki et al.

(10) Patent No.: US 7,415,637 B2
(45) Date of Patent: Aug. 19, 2008

(54) METHOD AND APPARATUS FOR ESTIMATING NETWORK TROUBLES

(75) Inventors: Tatsu Suzuki, Kanagawa (JP); Tomonori Kaizuka, Kanagawa (JP); Akiko Namai, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 463 days.

(21) Appl. No.: 10/949,709

(22) Filed: Sep. 24, 2004

(65) Prior Publication Data

US 2005/0216785 A1   Sep. 29, 2005

(30) Foreign Application Priority Data

Mar. 18, 2004   (JP)   ............... 2004-078760

(51) Int. Cl.
*G06F 11/00*   (2006.01)
(52) U.S. Cl. .............. 714/47; 714/4; 709/223; 709/224
(58) Field of Classification Search .......... 714/47
See application file for complete search history.

(56) References Cited

U.S. PATENT DOCUMENTS

| 5,666,481 | A | | 9/1997 | Lewis | |
|---|---|---|---|---|---|
| 5,748,880 | A | | 5/1998 | Ito et al. | |
| 5,872,911 | A | * | 2/1999 | Berg | ............ 714/43 |
| 6,023,775 | A | | 2/2000 | Fujii | |
| 6,708,291 | B1 | | 3/2004 | Kidder | |
| 2003/0191825 | A1 | * | 10/2003 | Miyazaki et al. | ............ 709/220 |
| 2005/0144151 | A1 | * | 6/2005 | Fischman et al. | ............ 706/45 |
| 2006/0259832 | A1 | * | 11/2006 | Kumamoto | ............ 714/47 |

FOREIGN PATENT DOCUMENTS

| JP | 3-195230 | 8/1991 |
|---|---|---|
| JP | 5-114899 | 5/1993 |
| JP | 5-260049 | 10/1993 |
| JP | 7-245609 | 9/1995 |
| JP | 8-44641 | 2/1996 |
| WO | WO 94/19888 | 9/1994 |

OTHER PUBLICATIONS

United Kingdom Search Report dated Jan. 26, 2005.

* cited by examiner

*Primary Examiner*—Emerson C Puente
(74) *Attorney, Agent, or Firm*—Katten Muchin Rosenman LLP

(57) ABSTRACT

A method of estimating a trouble in a network is disclosed, including the following steps: displaying a model network in which the network is modeled by each combination of a network apparatus and a connection; inputting information of trouble portion in the model network and trouble symptom; registering at least trouble portion, trouble symptom, cause portion, and frequency of past trouble instances occurred in the model network to an instance database; retrieving the instance database using the input trouble portion and trouble symptom as retrieval keys; and estimating and displaying cause of the trouble based on the cause portion and frequency of a retrieved instances record. The past trouble instances accumulated in the instance database can be retrieved by the instance retrieval unit using the trouble portion and trouble symptom as the retrieval key. The network trouble estimation apparatus can estimate the cause portion at high accuracy.

6 Claims, 11 Drawing Sheets

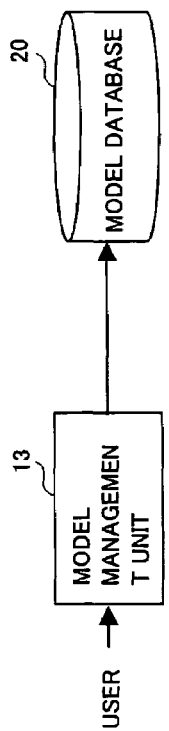

FIG.3A

FIG.3B INTRA-APPARATUS PORTION TABLE

| INTRA-APPARATUS PORTION | CONNECTED INTRA-APPARATUS PORTION 1 | CONNECTED INTRA-APPARATUS PORTION 2 | ... | CONNECTED INTRA-APPARATUS PORTION n | ACCOMMODATED TRAIL PORTION 1 | ACCOMMODATED TRAIL PORTION 2 | ... | ACCOMMODATED TRAIL PORTION n | ERROR RATE PER YEAR | CATEGORY OF APPARATUS |
|---|---|---|---|---|---|---|---|---|---|---|
| PORTION B-1 | PORTION B-2 | | | | | | | | 4.0% | PACKAGE PRODUCT X |
| PORTION B-2 | | | | | PHYSICAL CHANNEL 2 | | | | 1.0% | PACKAGE PRODUCT Y |
| PORTION B-3 | | | | | PHYSICAL CHANNEL 3 | | | | 7.0% | PACKAGE PRODUCT Z |
| ...... | | | | | | | | | | |

FIG.3C TRAIL TABLE

| PHYSICAL CHANNEL /PATH CONNECTION (TRAIL) PORTION | LOWER ACCOMMODATED TRAIL PORTION 1 | LOWER ACCOMMODATED TRAIL PORTION 2 | ... | LOWER ACCOMMODATED TRAIL PORTION n | ERROR RATE PER YEAR | CATEGORY OF APPARATUS |
|---|---|---|---|---|---|---|
| PHYSICAL CHANNEL 2 | 1ST LAYER PATH 1 | | | | 4.0% | PHYSICAL CHANNEL |
| PHYSICAL CHANNEL 3 | 1ST LAYER PATH 2 | | | | 4.0% | PHYSICAL CHANNEL |
| 1ST LAYER PATH 1 | 2ND LAYER PATH 1 | | | | N/A | PASS |
| 2ND LAYER PATH 1 | 3RD LAYER PATH 1 | | | | N/A | PASS |
| ...... | | | | | | |

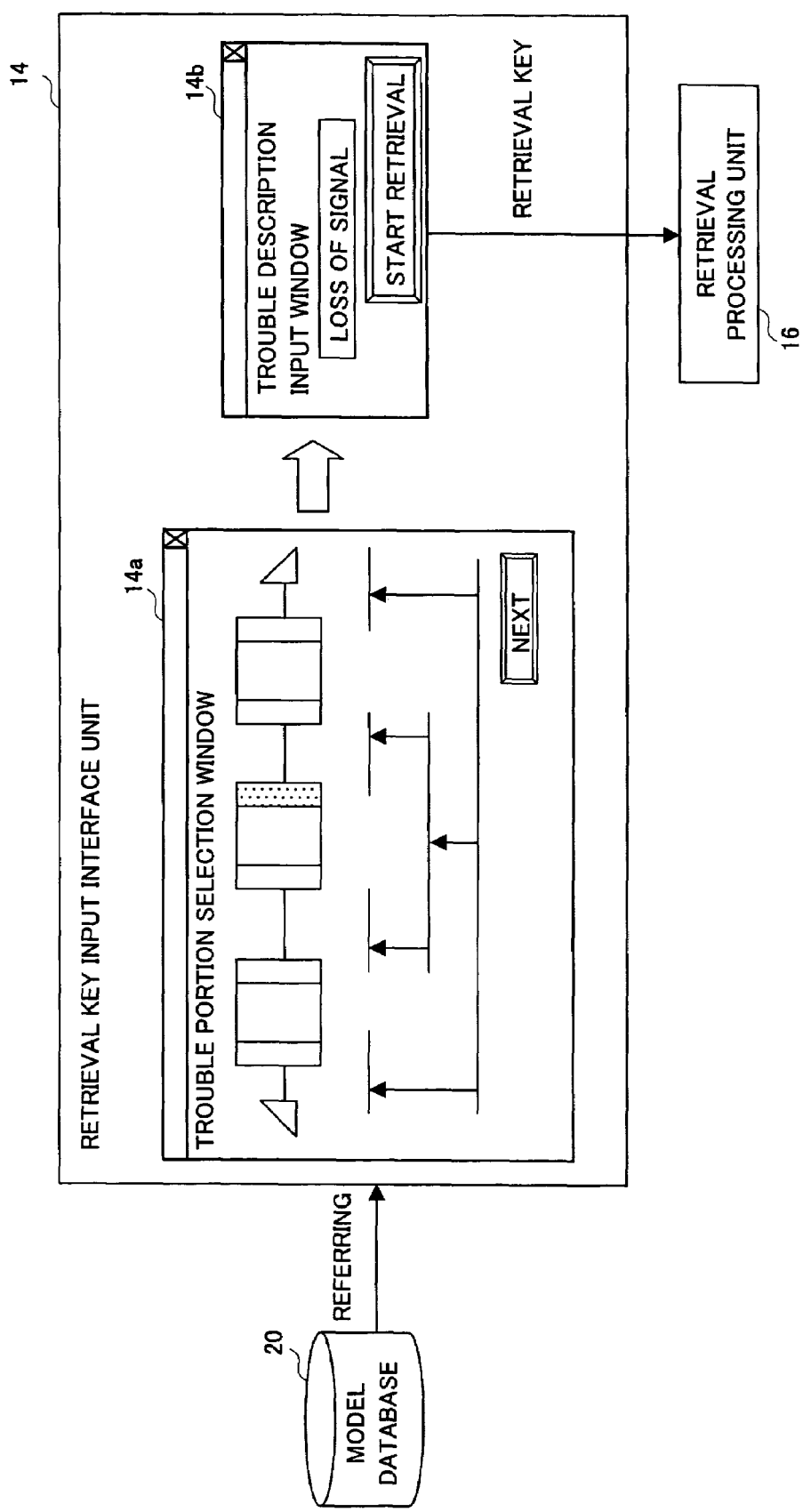

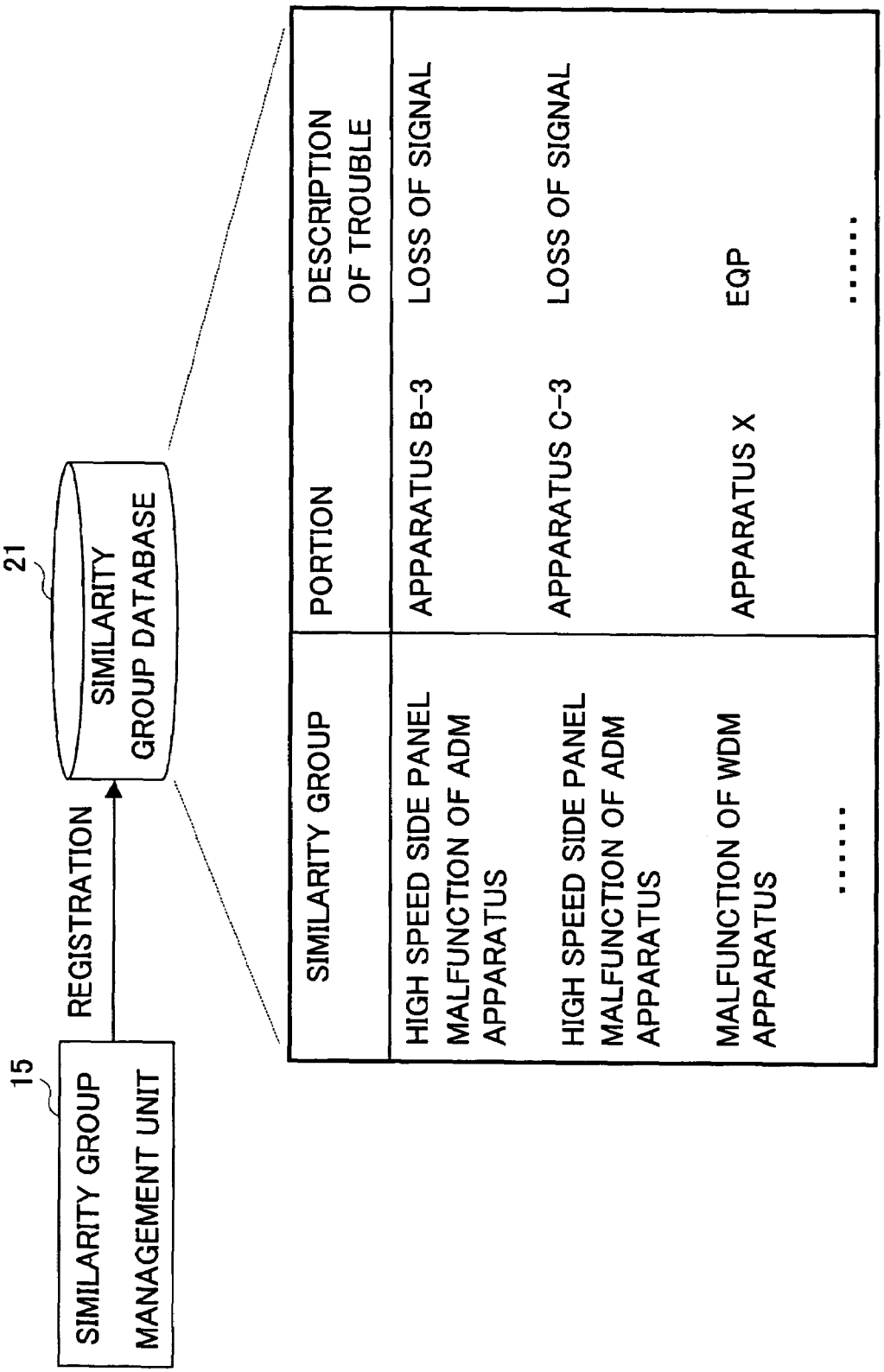

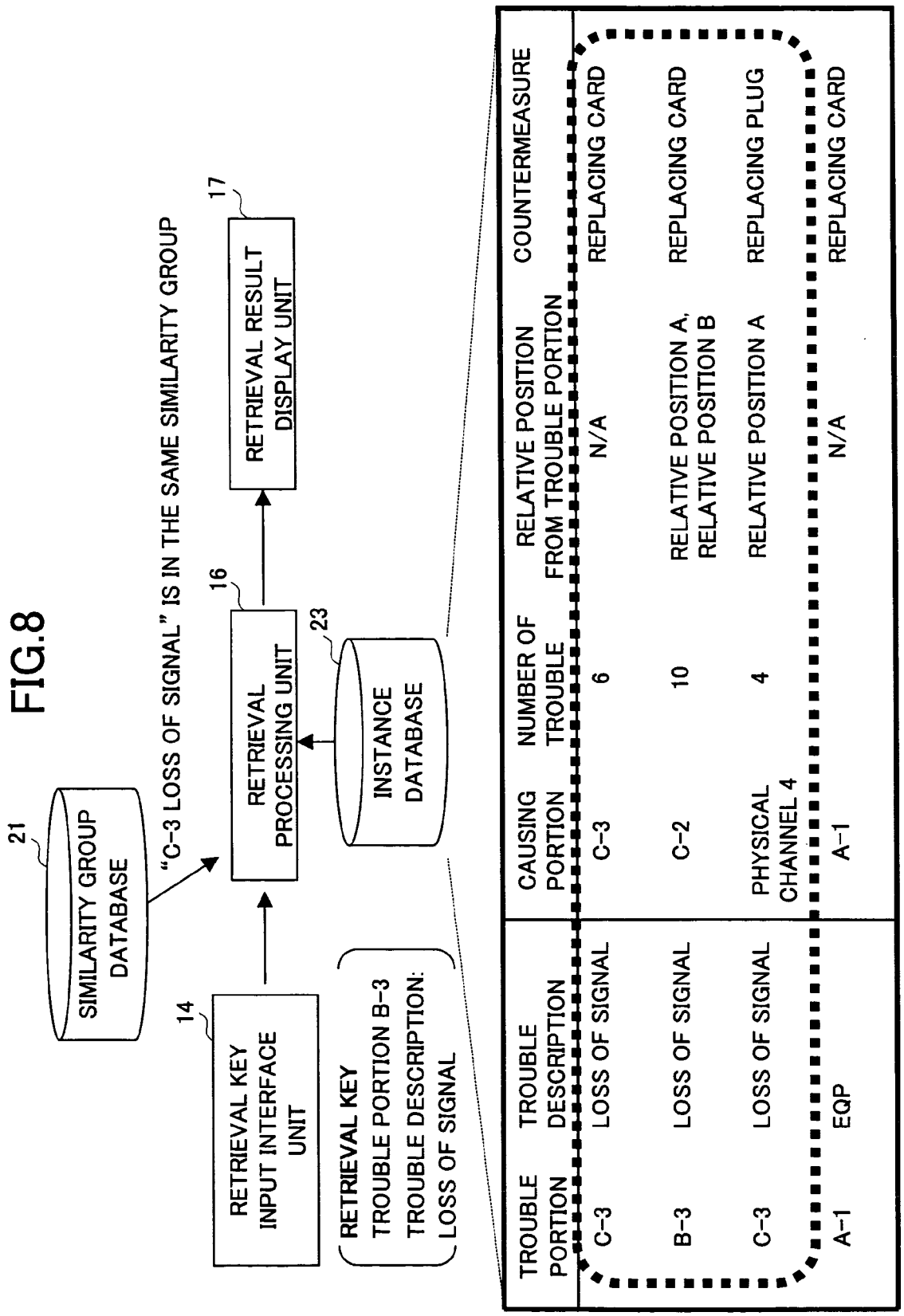

FIG.11

| APPARATUS | | ERROR RATE PER YEAR | PROBABILITY OF MALFUNCTION | ORDER |
|---|---|---|---|---|
| CONNECTION B | PACKAGE B-3 | 7.0% | 3.5% | 6 |
| CONNECTION B~C | | 10.0% | 5.0% | 5 |
| CONNECTION C | PACKAGE C-2 | 3.0% | 1.5% | 8 |
| CONNECTION C | PACKAGE C-1 | 5.0% | 2.5% | 7 |
| CONNECTION C | PACKAGE C-3 | 10.0% | 5.0% | 5 |
| CONNECTION C~D | | 30.0% | 15.0% | 2 |
| CONNECTION D | PACKAGE D-2 | 15.0% | 7.5% | 4 |
| CONNECTION D | PACKAGE D-1 | 10.0% | 5.0% | 5 |
| CONNECTION D | PACKAGE D-3 | 10.0% | 5.0% | 5 |
| CONNECTION D~E | | 40.0% | 20.0% | 1 |
| CONNECTION E | PACKAGE E-2 | 10.0% | 5.0% | 5 |
| CONNECTION E | PACKAGE E-1 | 10.0% | 5.0% | 5 |
| CONNECTION E | PACKAGE E-3 | 10.0% | 5.0% | 5 |
| CONNECTION E~F | | 20.0% | 10.0% | 3 |
| CONNECTION F | PACKAGE F-2 | 10.0% | 5.0% | 5 |
| TOTAL | | 200.0% | | |

METHOD AND APPARATUS FOR ESTIMATING NETWORK TROUBLES

BACKGROUND OF THE INVENTION

1. Field of the Invention

The present invention generally relates to a method and an apparatus for estimating troubles in a network, and more particularly, to the estimating of a trouble portion in the network including network apparatuses and connections.

2. Description of the Related Art

Conventionally, troubles in a network system are resolved in the following manner:

(1) When a trouble occurs, various network apparatuses transmit alarm signals. The alarm signals are collected using a monitoring system, for example.

(2) Generally, plural alarm signals may be collected. Only the alarm signals transmitted by the network apparatus that has actually caused the trouble or is close to the actual cause are extracted, and the other alarm signals transmitted by the other network apparatuses that have been affected by the actual cause are discarded. This process is performed by a main cause determination system or manually by an operator, for example.

(3) The actual cause of the trouble is further pursued and estimated based on the extracted alarm signals with reference to past experiences and on trial and error basis. This process is performed by operators.

(4) The cause of the trouble is removed, and the network system is recovered by replacing the package of a causing network apparatus and/or repairing connections.

The above steps (1) and (2) in which the alarm signals are collected and extracted may be supported by a system. Conventionally, the above step (3) is not supported by a system in most cases, and rather performed by operators based on their experiences.

In some cases, a knowledge management system storing past trouble instances has been used for supporting the estimation of cause by the operators. However, such knowledge management system stores instances using natural sentences, and as a result, the operators need to retrieve the instances by natural sentences.

Japanese Patent Laid-Open Application No. 5-114899 discloses a network trouble remote monitoring system that estimates trouble portion in a network by identifying a predefined set of possible trouble portions for each alarm signal based on the alarm signals, the connective relation of the network apparatuses, and a network connection configuration model, and obtaining a product of the identified predefined sets.

Japanese Patent Laid-Open Application No. 7-245609 discloses a network trouble remote monitoring system that uses a trouble propagation model created based on the design knowledge of network elements constituting the network thereby to analyze the cause of trouble based on symptoms.

Japanese Translation of Published PCT International Application No. WO94/19888 discloses a network trouble remote monitoring system that retrieves a trouble ticket associated with unsolved trouble ticket using an information theory derived algorithm and neural network learning algorithm, for example.

Japanese Patent Laid-Open Application 5-260049 discloses a network trouble remote monitoring system that, when an alarm signal is transmitted, estimates which, malfunction or the influence of the malfunction, the alarm signal is caused by, based on the relative probabilities in which a channel or the apparatus to which the channel is accommodated malfunctions or is influenced by the malfunction for each trouble reason.

If the trouble cause is estimated by operators using their human skills and experiences, since each operator has different skill and experience, not all of them can estimate the trouble cause quickly and correctly.

In case of the conventional knowledge management system storing past trouble instances, most of them registers knowledge using natural sentences, and retrieves the knowledge by natural sentences. As a result, such a knowledge management system fails to uniquely represent the portion causing an alarm signal, symptoms, and trouble causes. Even if a similar trouble occurs at another portion, the knowledge management system cannot retrieve appropriate past trouble instance.

SUMMARY OF THE INVENTION

Accordingly, it is a general object of the present invention to provide a novel and useful method and apparatus for estimating trouble in a network in which one or more of the problems described above are eliminated.

Another and more specific object of the present invention is to provide a method and an apparatus in which past trouble instances can be used effectively, and a trouble portion in the network can be estimated at high precision.

To achieve at least one of the above objects, according to an aspect of the present invention, a method of estimating a trouble in a network includes the steps of: displaying a model network in which the network is modeled by each combination of a network apparatus and a connection; inputting information of trouble portion in the model network and trouble symptom; registering at least trouble portion, trouble symptom, cause portion, and frequency of past trouble instances occurred in the model network to an instance database; retrieving the instance database using the input trouble portion and trouble symptom as retrieval keys; and estimating and displaying cause of the trouble based on the cause portion and frequency of a retrieved instances record.

According to another aspect of the present invention, a network trouble estimation apparatus includes: an input unit that displays a model network in which the network is modeled by each combination of a network apparatus and a connection, and receives information of trouble portion in the model network and trouble symptom; an instance database in which at least trouble portion, trouble symptom, cause portion, and frequency of past trouble instances occurred in the model network are registered; an instance retrieval unit that retrieves the instance database using the trouble portion and trouble symptom as retrieval keys by the input unit; and a display unit that estimates and displays cause of the trouble based on the cause portion and frequency of a retrieved instances record.

According to the above arrangements, the past trouble instances accumulated in the instance database can be retrieved by the instance retrieval unit using the trouble portion and trouble symptom as the retrieval key. As a result, the network trouble estimation apparatus can estimate the cause portion at high accuracy.

Other objects, features, and advantages of the present invention will be more apparent from the following detailed description when read in conjunction with the accompanying drawings.

BRIEF DESCRIPTION OF THE DRAWINGS

FIG. 3A is a schematic diagram showing the registration to a model database according to an embodiment;

FIGS. 3B and 3C are exemplary tables included in the model database according to an embodiment;

FIG. 5 is a schematic diagram showing the inputting of a retrieval key according to an embodiment;

FIG. 6 is a schematic diagram showing the management of similarity group according to an embodiment;

FIG. 8 is a schematic diagram for explaining retrieval processing according to an embodiment;

FIG. 11 is an exemplary table showing error rates per year and probability of malfunction of portions that may cause troubles.

DETAILED DESCRIPTION OF THE PREFERRED EMBODIMENTS

The preferred embodiments of the present invention are described in detail below with reference to the drawings.

According to the present invention, when a trouble occurs in a network, each combination of a network apparatus and a connection of the network is modeled, and a trouble portion and its symptom are designated in the modeled network thereby to estimate probable trouble cause and countermeasures.

Figure 1:
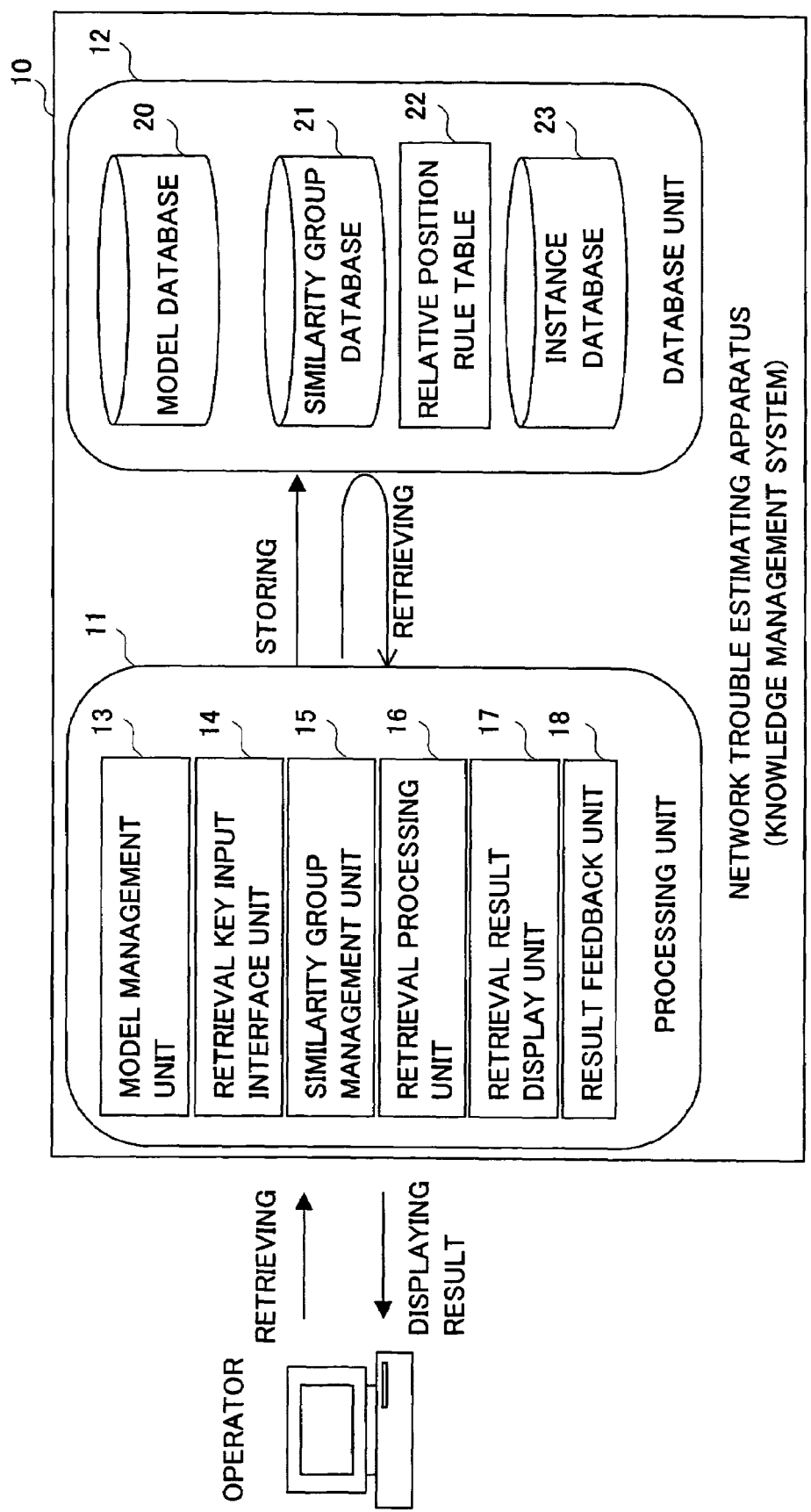
FIG. 1 is a block diagram showing an apparatus for estimating troubles in a network, according to an embodiment.

FIG. 1 is a block diagram showing a network trouble estimation apparatus according to an embodiment. The network trouble estimation apparatus of FIG. 1 is a knowledge management system including a processing unit 11 and a database unit 12.

The processing unit 11 includes the following: a model management unit 13, a retrieval key input interface unit 14, a similarity group management unit 15, a retrieval processing unit 16, a retrieval result display unit 17, and a result feedback unit 18.

The model management unit 13 manages a modeled network (hereinafter, called "model network"). The retrieval key input interface unit 14 receives the input of a retrieval key for retrieving the occurred trouble from the model network. The similarity group management unit 15 manages similar portions as a group. The retrieval processing unit 16 retrieves past instances. The retrieval result display unit 17 displays the result of retrieval on the model network. The result feedback unit 18 registers the results of actually occurred troubles in an instance database 23 (described below) in order to use them as past instances.

The database unit 12 includes the following: a model database 20, a similarity group database 21, a relative position rule table 22, and an instance database 23.

The model database 20 stores the model networks. The similarity group database 21 stores similarity groups. The relative position rule table 22 defines relative positions between portions and retrieval rules from the model database 20. The instance database 23 stores past trouble instances.

The model database 20 stores the following information: each portion (a package, for example) of a network apparatus such as a transmission apparatus; each connection (physical channel) connecting the network apparatuses; each path logically registered in plural network apparatuses; and the accommodation relation among the network apparatuses, connections (physical channels), and the paths.

For example, when a trouble occurs, the operator of the network can select the alarming portions (trouble portions) from the modeled network and input the symptom of the trouble using the retrieval key input interface unit 14.

The retrieval processing unit 16 extracts a record in which the trouble portion and the trouble symptom match from the instance database 23, and display the frequency and probability of the extracted trouble on the retrieval result display unit 17 so that the operator is informed of the instance.

According to the above arrangement, the knowledge management system can accumulate trouble instances occurring in the same trouble portion of the model network. The operator can correctly estimate the trouble portion and countermeasures thereto quickly regardless of her capability.

The similarity group management unit 15 registers similar portions in the similarity group database 21 so that the knowledge management system can handle the similar portions as a group. If a particular portion is input as a retrieval key, the retrieval processing unit 16 retrieves similar portions to the particular portion from the instance database 23, and informs the operator of the portion that has caused troubles in the similar portions instead of the trouble portion.

As described above, the network trouble cause estimation apparatus 10 according to an embodiment can retrieve not only the trouble portion but also the similar portions thereby to make the troubles in the similar portions common. Accordingly, if a trouble occurs in a similar portion in the same model network or another model network, or if the network is partially changed or expanded, the network trouble cause estimation apparatus 10 can efficiently use past knowledge.

The model database 20 stores estimated values (estimated MTBF in accordance with a design or known actual value) of error rates for each network apparatus and each connection of the model network of the model network. If a trouble occurs and the trouble portion and symptom are input, a predefined model network is referred to. A package and a connection that possibly causes the trouble in the trouble portion are extracted. Then, the portion that has probably caused the trouble is estimated based on estimated error rate. According to the above arrangement, just after the network trouble cause estimation apparatus is begun to operate, and consequently even if sufficient instances have not been accumulated, the network trouble cause estimation apparatus 10 according to an embodiment can estimate the cause of the trouble in the network.

Figure 2:
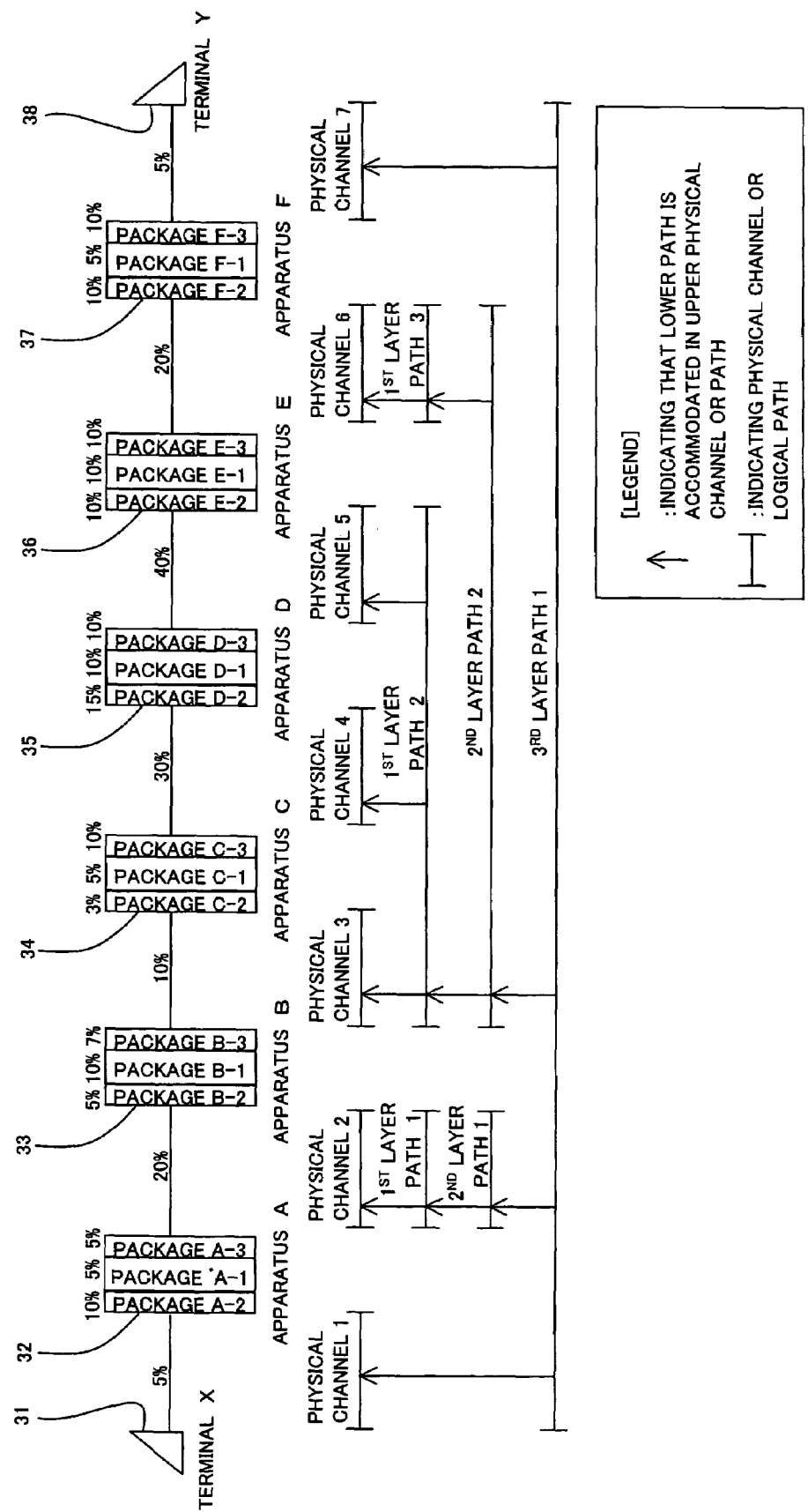
FIG. 2 is a schematic diagram showing a model network according to an embodiment.

FIG. 2 is a schematic diagram showing a model network according to an embodiment. The model network shown in FIG. 2 is registered in the model database 20 so that the other units can use the model network. The model network is modeled based on the actual network. As shown in FIG. 2, the model network includes network apparatuses 32-37 connected each other. Additionally, a terminal X 31 and another terminal Y 38 are connected to the network apparatuses 32 and 37, respectively.

The network apparatus 32 (apparatus A) is a Synchronous Digital Hierarchy (SDH) apparatus, for example. The network apparatus 32 is provided with packages A-1, A-2, and A-3. The package A-2 is connected to the terminal 31 via a physical channel 1. The network apparatus 33 (apparatus B) is an Add Drop Multiplexer (ADM) apparatus, for example. The network apparatus 33 is provided with packages B-1, B-2, and B-3. The package B-2 is connected to the package A-3 via a physical channel 2.

The network apparatus 34 (apparatus C) is a Wavelength Division Multiplexing (WDM) apparatus, for example. The network apparatus 34 is provided with packages C-1, C-2, and C-3. The package C-2 is connected to the package B-3 via a physical channel 3.

The network apparatus 35 (apparatus D) is a Wavelength Division Multiplexing (WDM) apparatus, for example. The network apparatus 35 is provided with packages D-1, D-2, and D-3. The package D-2 is connected to the package C-3 via a physical channel 4.

The network apparatus 36 (apparatus E) is an ADM apparatus, for example. The network apparatus 36 is provided with packages E-1, E-2, and E-3. The package E-2 is connected to the package D-3 via a physical channel 5.

The network apparatus 37 (apparatus F) is a Asynchronous Transfer Mode (ATM) apparatus, for example. The network apparatus 37 is provided with packages F-1, F-2, and F-3. The package F-2 is connected to the package E-3 via a physical channel 6. The package F-3 is connected to the terminal 38 via a physical channel 7.

Third layer path 1 connects the terminals 31 and 38. The portion of the $3^{rd}$ layer path 1 between the connection X-A is directly accommodated in the physical channel 1. The portion of the $3^{rd}$ layer path 1 between the connection A-B is accommodated in a $2^{nd}$ layer path 1, the $2^{nd}$ layer path 1 is accommodated in a $1^{st}$ layer path 1, and the $1^{st}$ layer path 1 is accommodated in the physical channel 2.

FIG. 2 shows an exemplary model network. Other model networks of various structures such as ring structure may be registered in the model database 20.

FIG. 3A shows the registration of the model networks to the model database 20. As shown in FIG. 3A, the model management unit 13 registers the model networks to the model database 20.

FIGS. 3B and 3C show an intra-apparatus portion table and a trail table, respectively, provided to the model database 20 according to an embodiment.

The intra-apparatus portion table 20a has records corresponding to respective portions such as packages B-1, B-2, and B-3. For example, the record corresponding to the intra-apparatus portion B-1 shows that it is connected to intra-apparatus portions B-2 and B-3, and its error rate per year is 4.0%. The record further indicates that the intra-apparatus portion B-1 is the package product X as a remark. The record corresponding to the intra-apparatus portion B-2 shows that is connected to the accommodated "physical channel 2", and its error rate per year is 1.0%. The record further indicates that the intra-apparatus portion B-2 is the package product Y as a remark.

The trail table 20b shown in FIG. 3C stores records corresponding to respective trails such as the physical channel 2 and the $1^{st}$ layer path. For example, the record corresponding to the physical channel 2 shows that the physical channel 2 accommodates a $1^{st}$ layer path 1, and its error rate per year is 4.0%. The record further indicates that the trail is a physical channel as a remark ("category of apparatus"). The record corresponding to the $1^{st}$ layer path 1 shows that it accommodates a $2^{nd}$ layer path 1, and it is a path as a remark.

Figure 4:
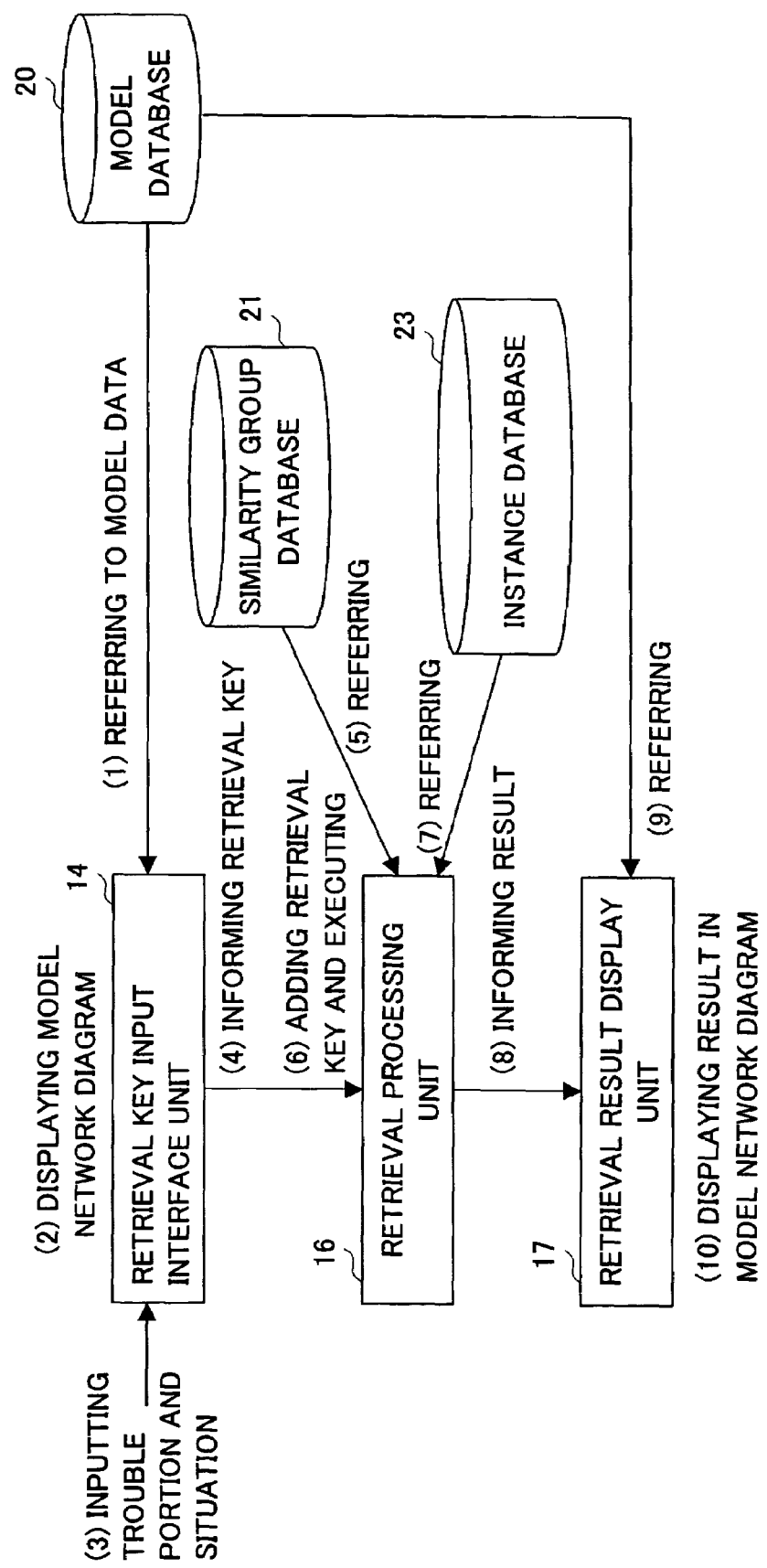
FIG. 4 is a schematic diagram showing retrieval process according to an embodiment.

FIG. 4 is a flow diagram showing retrieval performed by the network trouble estimation apparatus 10 according to an embodiment.

(1) The retrieval key input interface unit 14 refers to the model database 20.
(2) The retrieval key input interface unit 14 displays a model network diagram.
(3) Looking at the displayed model network diagram, the operator inputs the trouble portion and symptom as a retrieval key through the retrieval key input interface unit 14.
(4) The retrieval key input interface unit 14 informs the retrieval processing unit 16 of the input retrieval key.
(5) Referring to the similarity group database 21, the retrieval processing unit 16 retrieves trouble portions and symptoms of the same similarity group as the input trouble.
(6) The retrieval processing unit 16 adds the retrieved similar portions and their symptoms to the retrieval key in order to execute knowledge retrieval.
(7) The retrieval processing unit 16 retrieves past trouble instances from the instance database 23.
(8) The retrieval processing unit 16 informs the retrieval result display unit 17 of the result.
(9) The retrieval result display unit 17 refers to the model database 20 for the configuration information of the modeled network.
(10) The retrieval result display unit 17 displays the model network, and displays the result in the model network diagram.

FIG. 5 is a schematic diagram for explaining the input of retrieval key. The retrieval key input interface unit 14 displays a trouble portion selection window 14a for designating the trouble portion using a mouse, for example, and a trouble description input window 14b for inputting trouble symptom in the model network diagram.

The portions obtained from the model database and their connections are displayed as a model network diagram. This model network diagram is similar to the model network diagram shown in FIG. 2. The portions such as packages, physical channels, and paths of the model network diagram are selectable. When the operator selects a trouble portion, the selected trouble portion is displayed in the trouble portion selection window 14a with its color reversed or changed, for example.

The description of trouble ("loss of signal", for example) is input to the trouble description input window 14b. After the trouble description is input, the retrieval key input interface unit 14 informs the retrieval processing unit of the selected trouble portion and input trouble description as retrieval key.

FIG. 6 is a schematic diagram for explaining the management of similarity groups. According to the present embodiment, the similarity group database 21 is provided to register and manage other trouble portions and trouble symptoms of the same model network, and the trouble portions and trouble symptoms of other model networks as a single similarity group.

For example, as shown in FIG. 6, a record of similarity group "high speed side panel malfunction of ADM apparatus" is registered that indicates "loss of signal" has occurred in "apparatus B-3", and other "loss of signal" has occurred in "apparatus C-3". Another record of similarity group "malfunction of WDM apparatus" is registered that indicates "EQP (transmission signal disconnected)" has occurred in "apparatus X". The similarity groups are registered by the similarity group management unit 15 in advance.

Figures 7A, 7B:
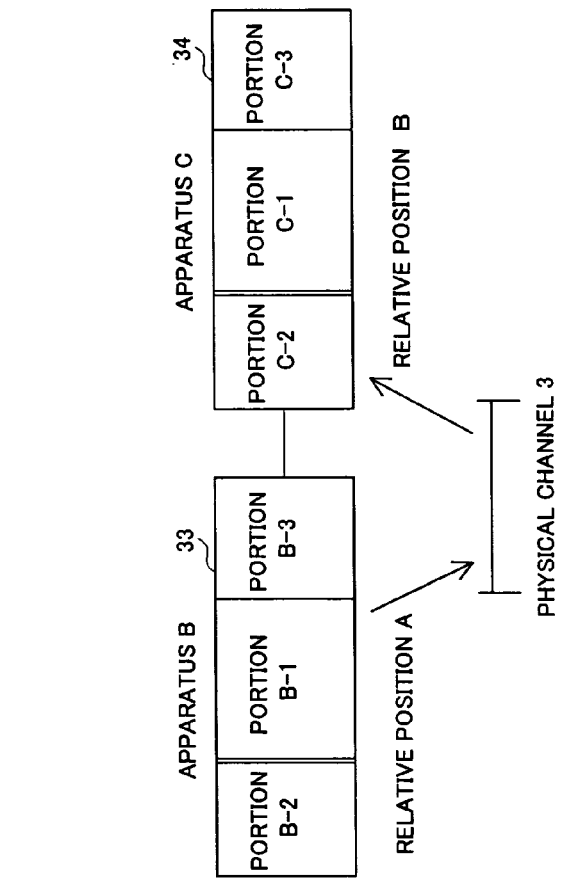
FIG. 7A is an exemplary relative position rule table according to an embodiment.
FIG. 7B is a schematic diagram showing the management of relative position according to an embodiment.

FIGS. 7A and 7B are schematic diagrams for explaining the management of relative positions. According to the present embodiment, the relative position rule table 22 that defines basic relative positions is provided that represents relative position from a particular portion in the model network.

As shown in FIG. 7A, the relative position rule table 22 defines rules to retrieve the model database, the rules corresponding to the relative position. Any position in the model network is represented by a combination of these relative positions. For example, "accommodated physical channel" is defined as "relative position A", and as "extracting accommodated trail portion from records of a particular portion of the intra-apparatus portion table 20a stored in the model database 20. Additionally, "accommodating intra-apparatus portion" is defined as "relative position B", and as "extracting intra-apparatus portion accommodating particular physical channel from intra-apparatus portion database.

According to the above arrangements, the relative position of the portion C-2 with respect to the intra-apparatus portion B-3 of the apparatus B can be represented using a combination of the relative position A and the relative position B as shown in FIG. 7B.

FIG. 8 is a schematic diagram for explaining retrieval processing. The retrieval key input interface unit 14 informs the retrieval processing unit 16 of the retrieval key "trouble portion B-3, trouble description: loss of signal". In response to receipt of the information, the retrieval processing unit 16 refers to the similarity group database 21 using the above retrieval key, and obtains a record "C-3 loss of signal" of trouble portion and description belonging to the same similarity group "high speed side panel malfunction of ADM apparatus". The obtained record is added to the retrieval key.

The instance database 23 uses a trouble portion and a trouble description as a key, and stores the following: a causing portion that has caused the trouble, the number of times the trouble has occurred, the relative position with respect to the trouble portion, and the countermeasure to the trouble.

The retrieval processing unit 16 extracts records of which trouble portion and trouble description match from the instance database 23 using the retrieval keys "trouble portion B-3, trouble description: loss of signal" and "trouble portion C-3, trouble description: loss of signal". In this case, three records marked with dotted line are extracted. The extracted record is informed to the retrieval result display unit 17 as the result of knowledge retrieval.

Figure 9:
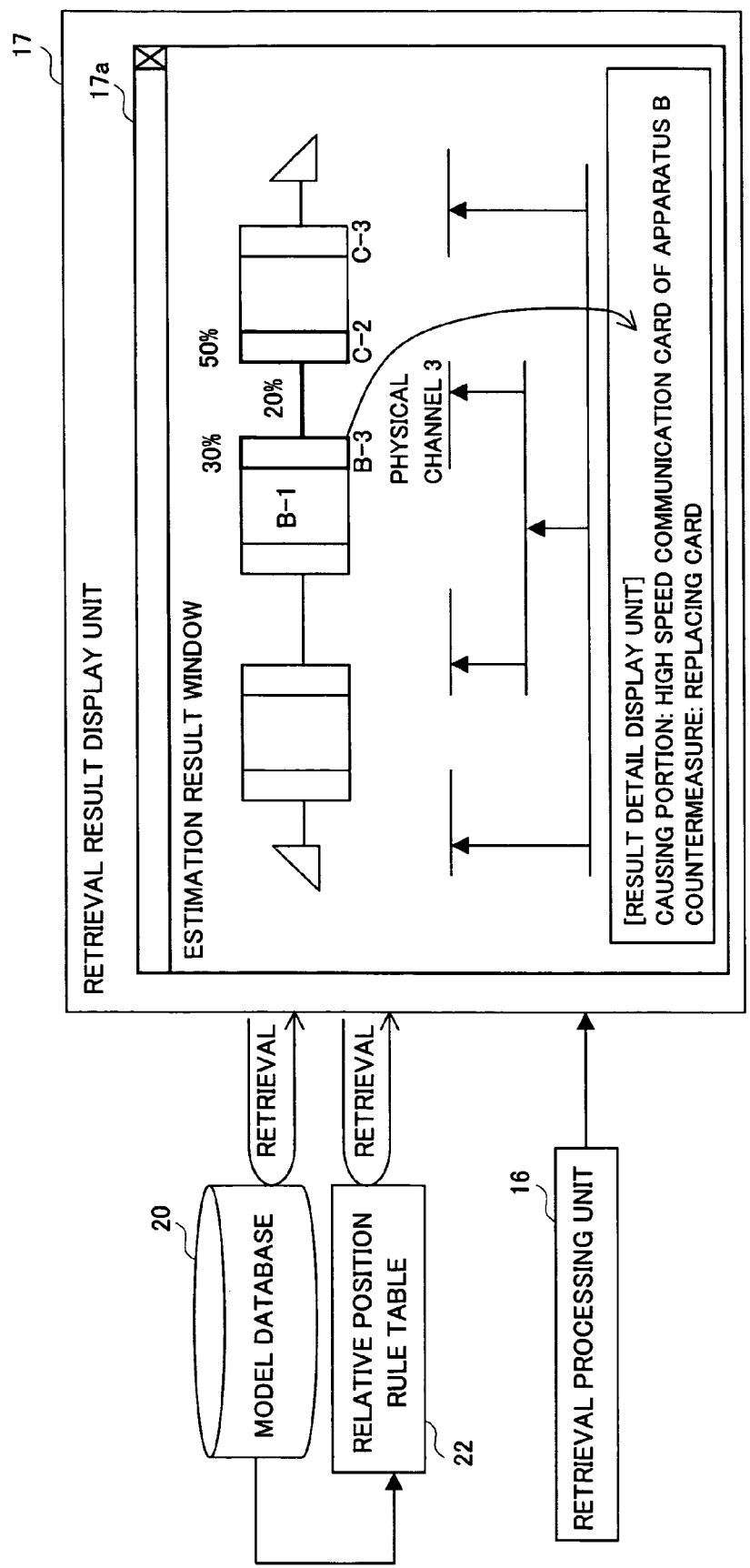
FIG. 9 is a schematic diagram for explaining the displaying of retrieval result according to an embodiment.

FIG. 9 is a schematic diagram for explaining the display of retrieval result. The retrieval result display unit 17 displays a estimation result window 17a. The model network diagram is shown with reference to the model database 20 in the estimation result window 17a. The retrieval result display unit 17 displays portions the relative positions of which are the "relative position from trouble portion" of the three marked records in FIG. 8 with respect to the trouble position B-3 of the retrieval key as the causing portion by reversing or changing their color.

The first record of the three records marked by dotted line indicates that the relative position from trouble portion is "N/A". This means that the trouble portion is the portion B-3 itself. The second record indicates that the relative position from trouble portion is "relative position A" and "relative position B". This means that the trouble portion is the portion C-2, the relative position of which is the relative position A and relative position B from the trouble portion B-3. The third record indicates that the relative position from the trouble portion is "relative position A". This means that the trouble portion is the physical channel 3 the relative position of which from the trouble portion B-3 is relative position A.

Then, the number of times (frequency) of troubles of the plural records (the three records marked by dotted line in FIG. 8) obtained by the retrieval are summed up. The ratio (%) of the frequency of each record is obtained, and the ratio (%) is displayed at the causing portion of each record. For example, in FIG. 9, the ratios 20%, 50%, and 30% are displays at the physical channel 3, the portion C-2, and the portion B-3, respectively.

When the operator selects one of the above physical channel 4, the portion C-2, and the portion B-3 in the estimation result window 17a using a mouse, for example, supplementary information such as the causing portion and countermeasure corresponding to the selected portion are displayed in the result detail display unit 17b.

When the trouble is recovered, the trouble is used as an instance. For this purpose, the result feedback unit 17 adds the following supplemental information to the instance database 23 as an instance record: trouble portion, trouble description, causing portion, the number of times of trouble (frequency), relative position from the trouble portion (a combination of relative positions defined by the relative position rule table), and countermeasure.

If enough number of instance records, or knowledge, are not accumulated in the instance database 23, the estimation of the trouble cause by the knowledge retrieval is difficult. In such a case, a probable cause of trouble is estimated based on estimated error rate.

Figure 10:
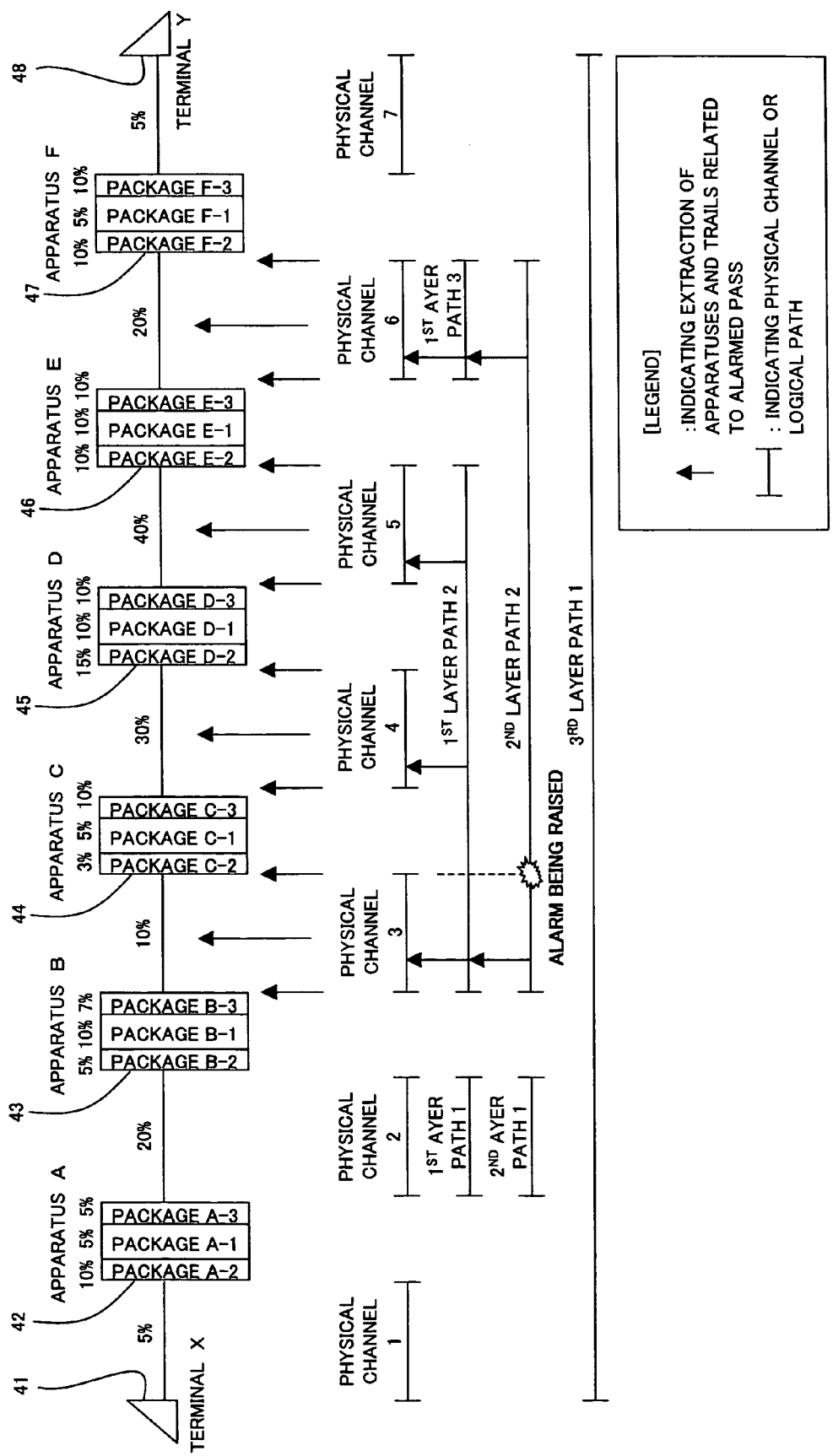
FIG. 10 is a schematic diagram showing the configuration of a model network for which trouble cause is estimated.

FIG. 10 is a model network diagram, the trouble cause of which is to be estimated. The model network is provided with network apparatuses A 42-F 47, and terminals 41 and 48. The apparatuses are physically connected by physical channels 1-7. First layer paths 1-3 are provided under the physical channels. Second layer paths 1 and 2 are provided under the $1^{st}$ layer paths. Third layer path 1 is provided under the $2^{nd}$ layer paths. Using these paths, the terminals 41 and 48 communicate to each other end-to-end.

An estimated error rate (MTBF of design or actual values) of each one of the packages of the network apparatuses 42-47 and physical channels 1-7 is registered in the model database 20.

In the case in which the $2^{nd}$ layer path 2 of the network apparatus 44 (apparatus C) has caused alarm, the operator designates the portion at which the alarm is caused (the $2^{nd}$ layer path 2) and the kind of caused alarm (influence alarm).

The network trouble estimation apparatus extracts upper rank path accommodating the $2^{nd}$ layer path 2 in which the alarm has been caused, and extracts the $1^{st}$ layer path 2 and the $1^{st}$ layer path 3 as a result. The network trouble estimation apparatus further extracts the most upper rank physical channels 3-6 accommodating the $1^{st}$ layer paths 2-3. The network trouble estimation apparatus extracts the following apparatuses and connections constituting the physical channels 3-6: the package B-3 of the network apparatus 43 (apparatus B); the connection B-C; the packages C-2, C-1, and C-3 of the network apparatus 44 (apparatus C), the connection C-D; the packages D-2, D-1, and D-3 of the network apparatus 45 (apparatus D); the connection D-E; the packages E-2, E-1, and E-3 of the network apparatus 46 (apparatus E); the connection E-F; and the package F-2 of the network apparatus 47 (apparatus F).

After extracting all packages and connections that may have caused the trouble, the network trouble estimation apparatus refers to their error rates (per year). FIG. 11 is an exemplary table showing the error rate per year of all portions that may have caused the trouble. The probability of malfunction of each portion based on the error rate per year. The sum of error rates is 200%. The probability of malfunction is obtained as shown in FIG. 11 by multiplying a factor ½ to all error rates so that the total becomes 100%. The network trouble estimation apparatus displays the probability of malfunction in the estimation result window 17a using the estimation result display unit 17, and suggests the operator which portion has higher probability to cause the trouble.

The network trouble estimation apparatus according to the present invention can correctly estimate the trouble portions and countermeasures quickly regardless of the capability of the operator. The use of model networks enables the network trouble estimation apparatus to use knowledge obtained from current and past troubles occurred in the same model network disposed at another location. Even if the network is partially changed or expanded, the knowledge obtained from similar troubles can be used.

Even immediately after the network trouble estimation apparatus is introduced, and if enough trouble instances have not been accumulated, the network trouble estimation apparatus can estimate the trouble cause by estimating the error rate per year based on design or past measurement.

The apparatus disclosed in Japanese Patent Laid-Open Application No. 5-114899 obtains a set of possible trouble portions by an alarm, and obtains the product of the sets. The network trouble estimation apparatus according to the present invention is different from the above apparatus in retrieving past trouble instances and obtaining the causing portions of the network trouble at high accuracy.

The apparatus according to Japanese Patent Laid-Open Application No. 7-245609 uses trouble propagation model, and analyzes the cause of trouble based on its symptom. The network trouble estimation apparatus according to the present invention is different from the above apparatus in retrieving past trouble instances and obtaining the causing portions of the network trouble at high accuracy.

The apparatus according to Published PCT International Application No. WO94/19888 retrieves trouble tickets associated with a un-solved trouble ticket using information theory derived algorithm or nerval network learning algorithm, for example thereby to obtain countermeasure. The network trouble estimation apparatus according to the present invention is different from the above apparatus in retrieving past trouble instances and obtaining the causing portions of the network trouble at high accuracy.

The apparatus disclosed in Japanese Patent Laid-Open Application 5-260049 estimates whether an alarm has caused by a trouble or the influence of the trouble based on the probabilities of the trouble and the influence of the trouble by the trouble cause when the alarm is caused. The network trouble estimation apparatus according to the present invention is different from the above apparatus in retrieving past trouble instances and obtaining the causing portions of the network trouble at high accuracy.

The retrieval key input interface unit 14 corresponds to an input unit. The retrieval processing unit 16 corresponds to an instance retrieval unit. The retrieval result display unit 17 corresponds to a display unit. The retrieval processing unit 16 corresponds to a retrieval key adding unit. The result feedback unit 18 corresponds to an instance updating unit.

The present invention is not limited to these embodiments, but various variations and modifications may be made without departing from the scope of the present invention.

This patent application is based on Japanese Priority Patent Application No. 2004-078760 filed on Mar. 18, 2004, the entire contents of which are hereby incorporated by reference.

What is claimed is:

1. A method of displaying a cause of a trouble in a network, the method comprising:
    displaying a model network in which the network is modeled by a combination of network apparatuses and their connections;
    inputting information of a trouble portion in the model network and a trouble symptom of the trouble portion;
    retrieving, from an instance database using the input trouble portion and the input trouble symptom as retrieval keys, an instance record, the instance database in which at least the trouble portion, the trouble symptom of the trouble portion, a cause portion of the trouble, and a frequency of the trouble in the past are registered;
    displaying the cause of the trouble based on the cause portion and the frequency of the trouble in the instance record retrieved from the instance database;
    registering at least a similar portion and the trouble symptom of the similar portion in a similarity group database;
    retrieving, from the similarity group database using the input trouble portion and the input trouble symptom, a particular trouble portion and a particular trouble symptom; and
    adding the particular trouble portion and the particular trouble symptom retrieved from the similarity group database to the retrieval keys for retrieving the instance record.

2. An apparatus for displaying a cause of a trouble in a network, comprising:
    a displaying unit that displays a model network in which the network is modeled by a combination of network apparatuses and their connections;
    an input unit that receives information of a trouble portion in the model network and a trouble symptom of the trouble portion;
    an instance database in which at least the trouble portion, the trouble symptom, a cause portion of the trouble, and a frequency of the trouble in the past are registered;
    an instance retrieval unit that retrieves an instance record from the instance database using the trouble portion and the trouble symptom as retrieval keys;
    a display unit that displays the cause of the trouble based on the cause portion and the frequency of the trouble in the retrieved instance record; and
    a similarity group database in which at least a similar portion and the trouble symptom of the similar portion are registered; and
    a retrieval key adding unit that retrieves, from the similarity group database using the trouble portion and the trouble symptom received by the input unit, a particular trouble portion and a particular trouble symptom, and adds the particular trouble portion and the particular trouble symptom retrieved from the similarity group database to the retrieval keys for retrieving the instance record.

3. The apparatus as claimed in claim 2, wherein
    the display unit displays a plurality of trouble causes based on the cause portion and the frequency of a plurality of instance records obtained by the retrieving from the instance database and the similarity group database, and displays a ratio corresponding to each cause of the trouble.

4. The apparatus as claimed in claim 2, further comprising:
    an instance updating unit that updates the instance database by adding instance records.

5. The apparatus as claimed in claim 2, wherein the instance database registers countermeasures in addition to the trouble portion, the trouble symptoms, the cause portions, and the frequencies of past trouble instances; and the display unit displays the cause and the countermeasure of the trouble based on the cause portion and the frequency obtained by the retrieving from the instance database and the similarity group database.

6. The apparatus as claimed in claim 2, wherein the display unit displays the cause of the trouble based on estimated error rate of each portion of network apparatuses and connections provided in the model network.

* * * * *